(12) United States Patent
Bianchi et al.

(10) Patent No.: US 8,199,631 B2
(45) Date of Patent: Jun. 12, 2012

(54) METHOD AND DEVICE FOR PROCESSING A CHANNEL AND COMMUNICATION SYSTEM COMPRISING SUCH DEVICE

(75) Inventors: Roberto Bianchi, Erlangen (DE); Frank Filipiak, München (DE); Werner Kozek, Vienna (AT)

(73) Assignee: Nokia Siemens Network Oy, Espoo (FI)

( * ) Notice: Subject to any disclaimer, the term of this patent is extended or adjusted under 35 U.S.C. 154(b) by 172 days.

(21) Appl. No.: 12/602,247

(22) PCT Filed: May 5, 2008

(86) PCT No.: PCT/EP2008/055486
§ 371 (c)(1),
(2), (4) Date: Jan. 20, 2010

(87) PCT Pub. No.: WO2008/145483
PCT Pub. Date: Dec. 4, 2008

(65) Prior Publication Data
US 2010/0172233 A1    Jul. 8, 2010

(30) Foreign Application Priority Data

May 29, 2007    (EP) .................................. 07 010 643

(51) Int. Cl.
*H04J 3/10* (2006.01)
*H04M 1/76* (2006.01)
(52) U.S. Cl. ........................................ 370/201; 379/416
(58) Field of Classification Search ................. None
See application file for complete search history.

(56) References Cited

U.S. PATENT DOCUMENTS

| 6,538,451 | B1 * | 3/2003 | Galli et al. | 324/533 |
| 6,687,336 | B1 * | 2/2004 | Holeys | 379/1.04 |
| 6,834,109 | B1 * | 12/2004 | Pare, Jr. et al. | 379/416 |
| 6,985,521 | B1 * | 1/2006 | Rezvani et al. | 375/222 |
| 2005/0195892 | A1 * | 9/2005 | Ginis et al. | 375/222 |

FOREIGN PATENT DOCUMENTS

WO    0124490 A1    4/2001

* cited by examiner

*Primary Examiner* — Clemence Han
(74) *Attorney, Agent, or Firm* — Laurence A. Greenberg; Werner H. Stemer; Ralph E. Locher

(57) ABSTRACT

A method and a device for processing a channel are disclosed. The channel is represented by a MIMO (multiple-input-multiple-output) system having first coefficients associated with transmission lines and second coefficients in particular associated with crosstalk. The method includes (i) clustering of the coefficients of the second coefficients; and (ii) processing of the clustered coefficients.

13 Claims, 3 Drawing Sheets

METHOD AND DEVICE FOR PROCESSING A CHANNEL AND COMMUNICATION SYSTEM COMPRISING SUCH DEVICE

BACKGROUND OF THE INVENTION

Field of the Invention

The invention relates to a method and a device for processing a channel and to a communication system comprising such a device.

DSL or xDSL, is a family of technologies that provide digital data transmission over the wires of a local telephone network.

Asymmetric Digital Subscriber Line (ADSL) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

VDSL (Very High Speed DSL) is an xDSL technology providing faster data transmission over a single twisted pair of wires. High bit rates are achieved at a range of about 300 meters (1000 ft), which allows for 26 Mbit/s with symmetric access or up to 52 Mbit/s in downstream-12 Mbit/s in upstream with asymmetric access.

Currently, standard VDSL uses up to 4 different frequency bands, two for upstream (from the client to the telecom provider) and two for downstream.

According to its high bandwidth, VDSL is capable of supporting applications like HDTV, as well as telephone services (e.g., Voice over IP) and general Internet access, over a single connection.

VDSL2 (Very High Speed Digital Subscriber Line 2) is an access technology that exploits the existing infrastructure of copper wires that were originally used for plain old telephone service (POTS). It can be deployed from central offices, from fiber-fed cabinets preferably located near the customer premises, or within buildings.

VDSL2 is designed to support the wide deployment of Triple Play services such as voice, video, data, high definition television (HDTV) and interactive gaming. VDSL2 enables operators and carriers to gradually, flexibly, and cost efficiently upgrade existing xDSL infrastructure.

ITU-T G.993.2 (VDSL2) is an enhancement to G.993.1 (VDSL) that permits the transmission of asymmetric and symmetric (full duplex) aggregate data rates up to 200 Mbit/s on twisted pairs using a bandwidth up to 30 MHz.

The xDSL wide band modulation approaches are problematic relating to crosstalk interference that is introduced to the twisted pair transmission line and received by the modem.

Crosstalk occurs when wires are coupled, in particular between wire pairs of the same or a nearby bundle that are used for separate signal transmission. Hence, data signals from one or more sources can be superimposed on and contaminate a data signal. The crosstalk comprises a near-end crosstalk (NEXT) and a far-end crosstalk (FEXT).

Based on such crosstalk, data signals transmitted over twisted-pair lines can be considerably degraded by the crosstalk interference generated on one or more adjacent twisted-pair phone lines in the same and/or a nearby multi-core cable or bundle. With an increasing transmission speed, this problem even deteriorates, which may significantly limit a maximum data rate to be transmitted via a single line.

A multiple-input-multiple-output system (hereinafter referred to as MIMO system) is of significant importance in modern communication technology. Such MIMO system allows to model crosstalk interference of a telecommunication system.

However, a MIMO system to be fully calculated implies a huge processing effort that sometimes is simply not feasible.

BRIEF SUMMARY OF THE INVENTION

The problem to be solved is to evaluate crosstalk with a reduced and in particular computable effort.

This problem is solved according to the features of the independent claims. Further embodiments result from the depending claims.

In order to overcome this problem a method for processing a channel is provided, wherein said channel is modeled or described by a MIMO system (multiple-input-multiple-output system) comprising first coefficients associated with transmission lines and second coefficients associated with crosstalk between the transmission lines, said method comprising the steps:
  clustering of the coefficients of the second coefficients;
  processing of the clustered coefficients.

It is to be noted that the channel modeled by the MIMO system can be regarded as a bundle of transmission lines, said transmission lines being used for data transfer (e.g., voice, user data, control information). The bundle of transmission lines may show crosstalk interference that prior to it being reduced can be assessed and/or evaluated by the approach presented herein.

The whole channel can be modeled comprising a Loop Plant Model LPM with an infrastructure of the transmission lines including but not limited to a main distribution frame, optional branching devices and crosstalk interferences of various kind. In particular, such LPM can be used to model upstream traffic (directed from a customer-premises equipment CPE to a central office CO) and downstream traffic (directed from the CO towards the CPE) via separate ports.

Further, the LPM may comprise a matrix of pulse responses comprising pulse responses of the transmission lines in its diagonal and crosstalk interference outside of the matrix' diagonal.

The approach presented herein allows to cluster coefficients of such LPM and to process the clustered coefficients separately thereby significantly reducing the overall processing complexity.

The approach can be used for evaluating crosstalk and hence improving a signal-to-noise ratio of the channel (by reducing an overall crosstalk).

In an embodiment, the processing of the clustered coefficients comprises the steps:
  adjusting a coefficient of the second coefficients according to a predefined value;
  determining a signal-to-noise ratio;
  adjusting the coefficient according to an improved signal-to-noise ratio.

The coefficient of the second coefficients is chosen according to a predefined value and based on such selection, a signal-to-noise ratio is calculated. In a next step, this coefficient (of the second coefficients) is adjusted in order to obtain an improved signal-to-noise ratio.

According to another embodiment, the method further comprises the steps:
  refining the breadth of the cluster;
  adjusting the coefficient according to an improved signal-to-noise ratio.

The range or breadth of the cluster is adjusted, preferably the cluster is scaled down. Then, the coefficient (of the second coefficients) is adjusted in order to obtain an improved signal-to-noise ratio.

In yet another embodiment, the method further comprises the step:

Until the breadth of the cluster has not reached a threshold, the signal-to-nose ratio is determined and the subsequent steps are iterated.

Hence, a predetermined threshold can be used to limit scaling down the breadth of said cluster. Until such limit is not reached, the steps can be repeatedly executed.

It is a further embodiment that the coefficient of the second coefficients is adjusted according to a predefined phase and/or by selecting such phase.

This phase can be selected in particular arbitrarily and the resulting signal-to-noise ratio can be monitored and hence optimized.

As another embodiment, several predefined phases are selected in parallel for adjacent carrier frequencies.

Advantageously, pursuant to a smoothness of the MIMO system multiple phases can be processed in parallel on adjacent carriers.

In a next embodiment, the method is used for crosstalk reduction or crosstalk compensation.

As a subsequent embodiment, the method is used in a digital subscriber line environment (xDSL).

It is also an embodiment that the method is used in a communication network.

The problem stated supra is also solved by a device for evaluating crosstalk comprising a processor unit that is arranged and/or equipped such that the method as described herein can be run on said processor unit.

In an embodiment, the device is a communication device, in particular a central office, a digital subscriber line access multiplexer or a customer-premises equipment.

The problem stated before is also solved by a communication system comprising a device as described herein.

Embodiments of the invention are shown and illustrated in the following figures:

DESCRIPTION OF THE INVENTION

Figure 1:
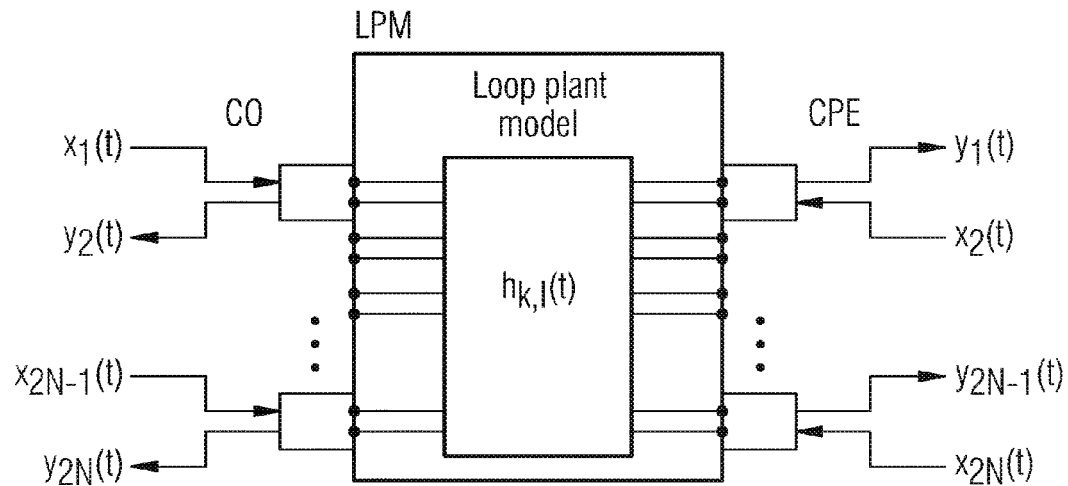
FIG. 1 shows a multiple-input-multiple-output (MIMO) system modeling near end crosstalk (NEXT) and far end crosstalk (FEXT)

FIG. 1 shows a multiple-input-multiple-output (MIMO) system modeling near end crosstalk (NEXT) and far end crosstalk (FEXT). The Loop Plant Model LPM represents the complete channel structure including (but not limited to) a main distribution frame, optional branching devices and crosstalk interferences of various kind.

Advantageously, such Loop Plant Model LPM can be used to model upstream (from a customer-premises equipment CPE to a central office CO) and downstream (traffic from the CO towards the CPE) traffic via separate ports.

Further, the Loop Plant Model LPM comprises a matrix of pulse responses comprising pulse responses of the transmission lines in its diagonal and crosstalk interference outside of the matrix' diagonal:

$$y_k(t) = \sum_{l=0}^{L-1} (h_{k,l} * x_l)(t), \quad (1)$$

wherein $h_{k,k}(t)$ is associated with the respective transmission line and hence represents the pulse response of said transmission line and $h_{k,l}(t)$ ($k \neq l$) represents the crosstalk interference outside of the matrix' diagonal, i.e. crosstalk interference between a port with an index k and another port with an index l.

It is to be noted that the symbol * expresses a convolution operation.

Preferably, discrete multitone transmission (DMT) synchronous DSL-ports are used, i.e. the input-output relationship according to equation (1) migrates to a multiplication of complex QAM coefficients according to:

$$Y_k(f) = \sum_{l=0}^{L-1} H_{k,l}(f) X_l(f) \quad (2)$$

It is an advantage that the approach provided herewith does not require any modification to be performed on the customer-premises equipment.

Identification of a linear time invariant system preferably requires a known input signal to be applied to the system thereby resulting in an output signal that is to be determined. A major focus can be directed to an assessment of such output signal, which is a difficult task to be performed via a feedback channel in xDSL. Although a feedback channel is available in upstream direction (from the customer-premises equipment to the central office), the bandwidth of the feedback channel is significantly smaller than a bandwidth in an xDSL downstream connection. In case of an active xDSL connection (also referred to as "showtime") it is problematic to use the upstream traffic as a feedback channel.

Procedures operating without any evaluation of an input signal are referred to as "blind" procedures. Such blind procedures are of limited functionality and are—if at all—only operable in the field of multi-carrier transmission within the sector of mobile radio communication providing a limited level of modulation (e.g., QAM<4) and the procedures are capable of handling a limited number of carriers (<128) only.

In contrast to mobile radio communication, xDSL, in particular VDSL, allows data rates with a high modulation level (e.g., up to 15) and a large number of carriers (e.g., up to 4096) resulting in a tremendous processing complexity. As an advantage, however, the field of xDSL uses a channel that is approximately time invariant.

Based on the physical conditions, in particular based on the limited signal propagation delay, the MIMO transfer function approximately has a limited band. This leads to an assumption that a coefficient to be determined or estimated is approximately constant for a certain number of carrier frequencies.

For evaluation purposes or estimation purposes of such a coefficient, an iterative procedure may be used, that in particular applies a trial-and-error process.

Hence, advantageously, an arbitrary phase can be chosen for compensation purposes and a resulting signal-to-noise ratio (SNR) is monitored. Pursuant to a smoothness of the MIMO system (representing the channel to be modeled) various phases for compensation purposes can be applied to adjacent carriers.

In order to increase efficiency of this approach, an overall bandwidth is divided in subchannels, i.e. the coefficients are clustered. The size of the clusters can be selected depending on a level of quantization of the adaptation and depending on the signal propagation delay.

In case the subchannels are roughly clustered, a coarse quantization can be used. Otherwise, (fine clusters) a fine quantization may preferably be applied.

Figure 2:
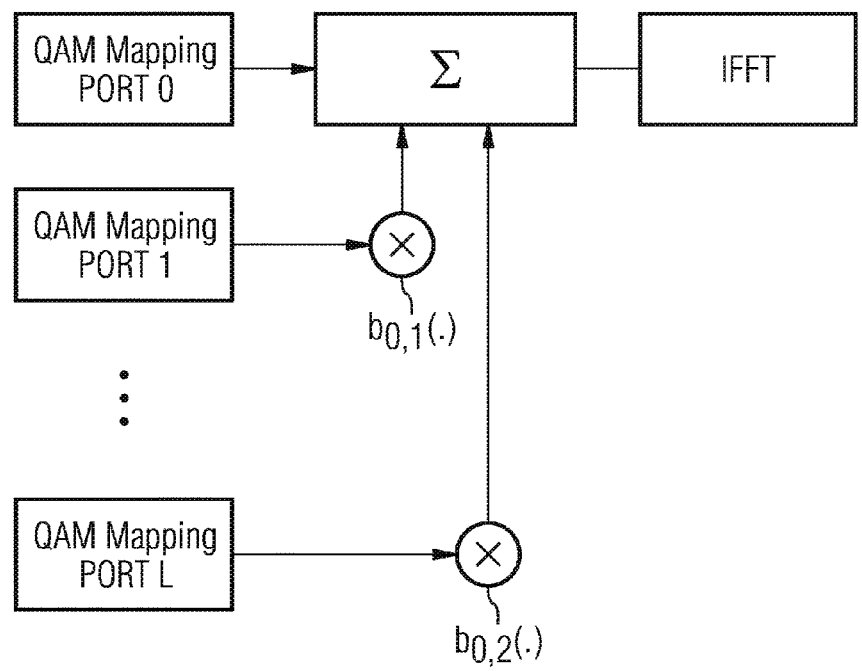
FIG. 2 shows a block diagram to be used for linear pre-compensation (on a sender)

FIG. 2 shows a block diagram to be used for linear pre-compensation (at a sender). A signal weighted by complex coefficients of the respective other ports is added (mixed) to a discrete multitone transmitter.

A QAM mapping is performed for each port 0 to L, wherein the signals for ports 1 to L are each multiplied by a complex compensation coefficient b. These multiplied values associated with ports 1 to L are than added with the signal from port 0 and further inverse fast Fourier transformed (IFFT).

Hereinafter, the following variables are referred to:

| | |
|---|---|
| $b_{k,l}(m)$ | a complex compensation coefficient (frequency-dependent matrix) |
| k, l | port index (0, 1, 2, . . . , L) |
| N | breadth of a subchannel |
| m' | index of a subchannel |
| m | index of a single carrier |
| P | binary word width of the compensation coefficient |
| Q | division of a phase (even number > 4) |
| p | index of the complex binary representation of $b_{k,l}$ |
| λ | complex weight of the compensation coefficient |

The complex compensation coefficients are represented in polar coordinates (absolute value and phase), wherein the absolute value is binary quantized and the phase is fractionized in Q steps (similar to phase shift keying PSK):

$$b_{k,l}(m) = \lambda \cdot \sum_{p=0}^{P} e^{\frac{j2\pi}{Q} \lfloor \frac{m(p)}{N} \rfloor} \cdot 2^P \quad (3)$$

It is to be noted that the (half-angular) brackets in FIG. 3 refer to a "nearest integer below value.

Assuming a binary word width of 16 bit (hence 16-bit multiplications), P will preferably amount to 4. Another advantage is the realization of the compensator via polar representation of a complex multiplication.

An estimation of the bit level of the compensation coefficients can be achieved by evaluating the maximum within averaged SNR values (averaging preferably is calculated across a group of carriers all of the same phase value, hence N):

$$m_{opt}(p) = \underset{m \in [QNm', QNm'+Q-1]}{\operatorname{argmax}} \sum_{m'=QNm''+Nn}^{QNm''+N(n+1)-1} \left(\frac{S}{N}\right)(m') \quad (4)$$

Adaptation of the compensation coefficients results in equating all phases of the subcarriers with the value as set forth by equation (4):

$$b_{k,l}(m) = \lambda \cdot \sum_{p=0}^{P} e^{\frac{j2\pi}{Q} \lfloor \frac{m_{opt}(p)}{N} \rfloor} \cdot 2^P \quad (5)$$

Figure 3:
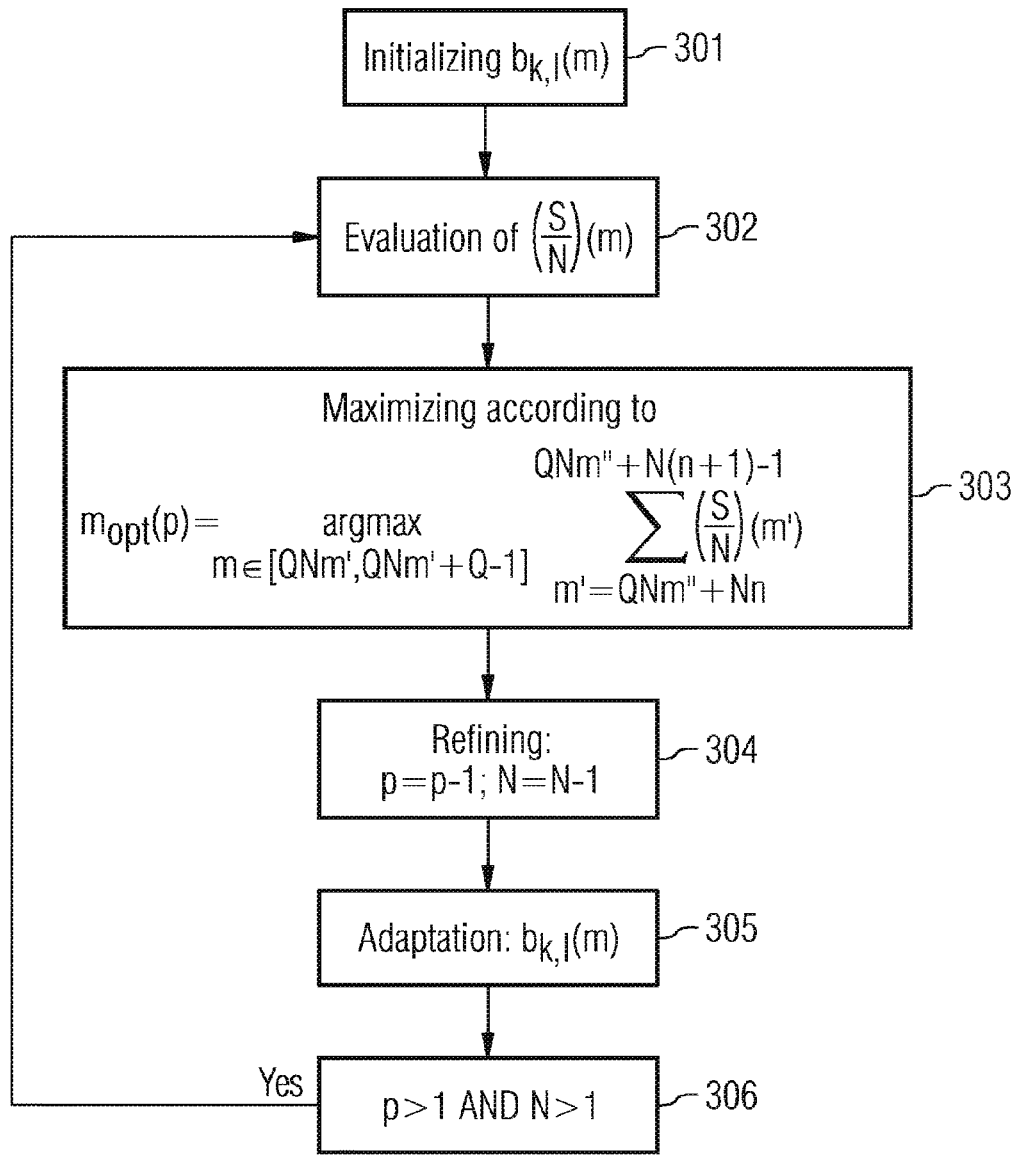
FIG. 3 shows a flow chart comprising steps of training the compensation coefficients.

FIG. 3 shows a flow chart comprising steps of training the compensation coefficients. In a step 301 the complex compensation coefficients $b_{k,l}(m)$ are initialized. In a step 302 the signal-to-noise ratio SNR is measured for a single carrier m. The signal-to-noise ratio SNR is maximized according to equation (4) in a step 303 and in a step 304 the index of the complex binary representation of $b_{k,l}$ and the breadth of a subchannel are refined. In a step 305 the complex compensation coefficients $b_{k,l}(m)$ are adapted. In a step 306 it is checked whether a further refinement is still possible. If this is the case, it is branched to the step 302, otherwise the training is finished.

The approach presented herewith allows a clustering of the MIMO system and a gradual refinement of the compensation coefficients. This only requires limited computational efforts and does save significant bandwidth in the feedback channel.

Figure 4:
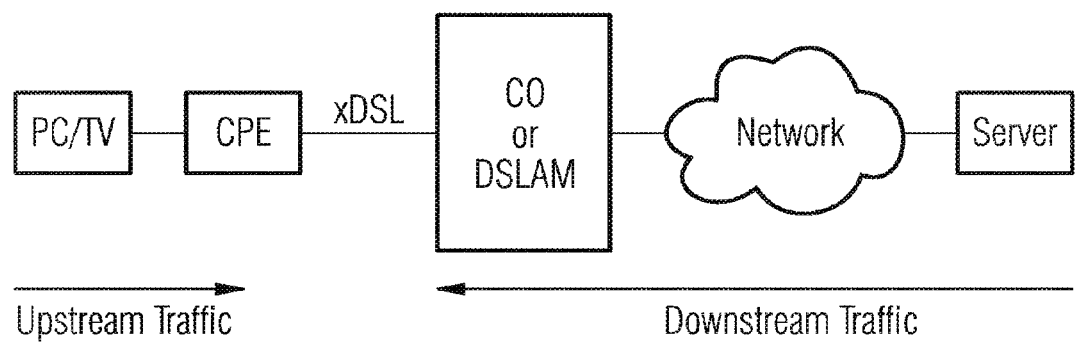
FIG. 4 shows a scenario comprising a communication network allowing to send data from a server to a client in particular via an xDSL connection.

A particular scenario of a communication network is shown in FIG. 4. Downstream Traffic is conveyed from the Server via a Network to a Central Office or Digital Subscriber Line Access Multiplexer CO/DSLAM. The CO/DSLAM is further connected via a digital subscriber line xDSL to a Customer-Premises Equipment CPE. The digital subscriber line connection can be in particular of the following type:

Asymmetric Digital Subscriber Line ADSL, ADSL2, ADSL2+;
High Data Rate Digital Subscriber Line HDSL;
Very High Speed Digital Subscriber Line VDSL, VDSL2.

The customer can be connected to the Customer-Premises Equipment CPE via a set-top box and a television or via a personal computer PC/TV. Data that is sent from the PC/TV towards the Server is referred to as Upstream Traffic.

Preferably, an operator or provider wants to efficiently use the xDSL downstream direction from the CO/DSLAM to the CPE by employing high data rate with low crosstalk effects.

The approach presented herein may be run within the CO/DSLAM and/or within the CPE. However, advantageously, a provider may only modify the CO/DSLAM to be able to run the methods as presented herein. In particular, the CPE does not have to be changed or modified.

The approach shown can be in particular used with discrete multitone modulation (DMT) or Orthogonal Frequency-Division Multiplexing (OFDM).

The invention claimed is:

1. A method of pre-compensating cross-talk in a channel, the channel being a multiple-input-multiple-output (MIMO) system having first coefficients associated with transmission lines and second coefficients associated with crosstalk, the method which comprises the following steps:
   clustering the second coefficients;
   adjusting a second coefficient according to a predefined value;
   determining a signal-to-noise ratio; and
   adjusting the second coefficient according to an improved signal-to-noise ratio.

2. The method according to claim 1, which comprises refining a breadth of a cluster of the clustered second coefficients; and adjusting the second coefficient according to the improved signal-to-noise ratio.

3. The method according to claim 2, which comprises, until the breadth of the cluster has not reached a threshold, determining the signal-to-nose ratio and repeating the method steps.

4. The method according to claim 1, wherein the adjusting step comprises adjusting the coefficient of the second coefficients by selecting a predefined phase.

5. The method according to claim 4, which comprises selecting several predefined phases in parallel for adjacent carrier frequencies.

6. The method according to claim 1, implemented in a digital subscriber line environment.

7. The method according to claim 1, implemented in a communication network.

8. The method according to claim 1, which comprises using the second coefficients for pre-compensating the crosstalk at a sender end of the channel.

9. The method according to claim 1, which comprises using the second coefficients for pre-compensating the crosstalk at a transmitter located at a sender end of the channel.

10. A device for evaluating crosstalk, comprising:
a processor unit programmed to execute thereon instructions for pre-compensating cross-talk in a channel being a multiple-input-multiple-output (MIMO) system having first coefficients associated with transmission lines and second coefficients associated with crosstalk;
the instructions for: clustering the second coefficients, adjusting a second coefficient according to a predefined value, determining a signal-to-noise ratio, and adjusting the second coefficient according to an improved signal-to-noise ratio.

11. The device according to claim 10, wherein the device is a communications device.

12. The device according to claim 11, wherein the device is a central office, a digital subscriber line access multiplexer, or a customer-premises equipment.

13. A communication system, comprising the device according to claim 10.

* * * * *